US011589959B2

(12) United States Patent
Vincent et al.

(10) Patent No.: US 11,589,959 B2
(45) Date of Patent: Feb. 28, 2023

(54) INTRAORAL DEVICE WITH A PAIR OF ARTICULATED DENTAL ALIGNERS

(71) Applicant: ONIRIS, Rueil-Malmaison (FR)

(72) Inventors: Gérard Vincent, Paris (FR); Thibault Vincent, Rueil Malmaison (FR)

(73) Assignee: ONIRIS ( * ) Notice: Subject to any disclaimer, the term of this patent is extended or adjusted under 35 U.S.C. 154(b) by 726 days.

(21) Appl. No.: 16/467,112

(22) PCT Filed: Dec. 7, 2017

(86) PCT No.: PCT/FR2017/053448
§ 371 (c)(1),
(2) Date: Jun. 6, 2019

(87) PCT Pub. No.: WO2018/104676
PCT Pub. Date: Jun. 14, 2018

(65) Prior Publication Data
US 2019/0388191 A1 Dec. 26, 2019

(30) Foreign Application Priority Data
Dec. 7, 2016 (FR) ...................................... 1662043

(51) Int. Cl.
A61C 7/36 (2006.01)
A61C 7/08 (2006.01)
A61C 9/00 (2006.01)

(52) U.S. Cl.
CPC .................. A61C 7/36 (2013.01); A61C 7/08 (2013.01); A61C 9/0006 (2013.01)

(58) Field of Classification Search
CPC ............ A61C 7/08; A61C 7/36; A61C 9/0006
See application file for complete search history.

(56) References Cited

U.S. PATENT DOCUMENTS 3,878,610 A * 4/1975 Coscina ............... A61C 9/0006
433/37
4,337,036 A * 6/1982 Hoffman .................. A61C 7/06
433/5

(Continued)

FOREIGN PATENT DOCUMENTS

EP 2 143 397 A1 1/2010
FR 2 872 406 A1 1/2006

(Continued)

OTHER PUBLICATIONS

International Search Report dated Feb. 16, 2018 in corresponding PCT International Application No. PCT/FR2017/053448.

(Continued)

Primary Examiner — Nicholas D Lucchesi
Assistant Examiner — Hao D Mai
(74) Attorney, Agent, or Firm — Ostrolenk Faber LLP

(57) ABSTRACT

An intraoral device (1) with a pair of dental aligners (10), each aligner having an outer shell (100) of rigid plastic in the shape of a rounded V defining branches joined at the front part (10a) of the outer shell. The front part has a truncated part in the form of an elongate notch (104), which confers flexibility on the outer shell in a plane orthogonal to the median sagittal plane of the aligners by bringing together or spacing apart the branches of the V. The outer shell includes an impression (106) formed in the front part on the outer face of the outer shell and extending on either side of the elongate notch. The notch cooperates with an attached wedge (50) which serves as a mechanical abutment for blocking flexion of the outer shell at a given curvature when the attached wedge (50) is fixed in the impression (106).

14 Claims, 1 Drawing Sheet

(56) References Cited

U.S. PATENT DOCUMENTS

| | | | | |
|---|---|---|---|---|
| 4,597,738 A * | 7/1986 | Sander | A61C 7/10 | 433/7 |
| 4,752,222 A * | 6/1988 | Bass | A61C 7/00 | 433/7 |
| 4,755,139 A * | 7/1988 | Abbatte | A61C 7/08 | 433/6 |
| 4,871,310 A * | 10/1989 | Vardimon | A61C 7/36 | 433/18 |
| 4,976,614 A * | 12/1990 | Tepper | A61C 7/00 | 433/21 |
| 5,096,416 A * | 3/1992 | Hulsink | A61C 7/08 | 433/6 |
| 5,167,499 A * | 12/1992 | Arndt | A61C 7/00 | 433/7 |
| 5,624,257 A * | 4/1997 | Farrell | A61C 7/08 | 128/861 |
| 5,829,970 A * | 11/1998 | Yousefian | A61C 7/10 | 433/7 |
| 6,109,265 A * | 8/2000 | Frantz | A61F 5/566 | 128/862 |
| 6,206,692 B1 * | 3/2001 | Komiyama | A61C 9/0006 | 433/41 |
| 6,428,315 B1 * | 8/2002 | Prestipino | A61C 9/0006 | 433/45 |
| 7,270,540 B2 * | 9/2007 | Skinner | A61C 9/0006 | 433/43 |
| 7,810,502 B1 * | 10/2010 | Nguyen | A61F 5/566 | 128/859 |
| 8,166,976 B2 * | 5/2012 | Webster | A61F 5/566 | 128/859 |
| 8,662,084 B2 * | 3/2014 | Thornton | A61C 7/36 | 128/859 |
| 9,656,114 B1 * | 5/2017 | Hafeez-Bey | A63B 21/00069 | |
| 10,357,335 B2 * | 7/2019 | Paul | A61C 7/08 | |
| 10,729,516 B2 * | 8/2020 | Hung | A61C 7/08 | |
| 11,273,010 B2 * | 3/2022 | Bear | A61C 7/20 | |
| 2004/0110108 A1 * | 6/2004 | Weissbach Otte | A61C 7/10 | 433/18 |
| 2011/0226261 A1 * | 9/2011 | Hernandez | A61F 5/566 | 128/848 |
| 2012/0145166 A1 * | 6/2012 | Fallon | A61F 5/566 | 128/848 |
| 2012/0255563 A1 | 10/2012 | Thornton | 128/861 | |
| 2013/0112210 A1 * | 5/2013 | Stein | A61F 5/566 | 128/848 |
| 2013/0263865 A1 * | 10/2013 | Khast | A61F 5/566 | 128/848 |
| 2013/0269712 A1 * | 10/2013 | Awde | A61F 5/566 | 128/848 |
| 2013/0295514 A1 * | 11/2013 | Koklu | A61C 7/36 | 433/6 |
| 2014/0072927 A1 * | 3/2014 | Diaz | A61F 5/566 | 433/6 |
| 2014/0186789 A1 * | 7/2014 | Valoir | A61C 7/008 | 433/2 |
| 2014/0352701 A1 * | 12/2014 | Ingemarsson-Matzen | A61F 5/566 | 128/848 |
| 2016/0128803 A1 * | 5/2016 | Webber | A61C 7/002 | 264/16 |
| 2016/0184129 A1 * | 6/2016 | Liptak | A61C 7/08 | 128/848 |
| 2016/0228286 A1 * | 8/2016 | Rayek | A61C 7/08 | |
| 2017/0367793 A1 * | 12/2017 | Veis | A61C 7/36 | |
| 2018/0153643 A1 * | 6/2018 | Lambert | A61F 5/566 | |
| 2018/0153733 A1 * | 6/2018 | Kuo | A61F 5/58 | |
| 2018/0193183 A1 * | 7/2018 | Kim | B23C 3/00 | |
| 2018/0353264 A1 * | 12/2018 | Riley | A61C 8/0096 | |
| 2019/0033826 A1 * | 1/2019 | Kim | G05B 19/4097 | |
| 2019/0321136 A1 * | 10/2019 | Martz | A61C 7/08 | |
| 2019/0380863 A1 * | 12/2019 | Mauclaire | A61F 5/566 | |
| 2021/0153977 A1 * | 5/2021 | Young | B33Y 50/00 | |

FOREIGN PATENT DOCUMENTS

| | | |
|---|---|---|
| FR | 2 993 769 A1 | 1/2014 |
| WO | WO 2014/016495 A1 | 1/2014 |

OTHER PUBLICATIONS

Written Opinion dated Feb. 16, 2018 in corresponding PCT International Application No. PCT/FR2017/053448.

* cited by examiner

INTRAORAL DEVICE WITH A PAIR OF ARTICULATED DENTAL ALIGNERS

CROSS-REFERENCE TO RELATED APPLICATIONS

The present application is a 35 U.S.C. §§ 371 national phase conversion of PCT/FR2017/053448, filed Dec. 7, 2017, the contents of which are incorporated herein by reference which claims priority of French Patent Application No. 1662043, filed Dec. 7, 2016, the contents of which are incorporated by reference herein. The PCT International Application was published in the French language.

The present invention relates to dental aligners intended to be disposed on the dental arches of the lower and upper jaws of a subject and connected by connecting rods fixed to fastening devices adapted for these connecting rods.

TECHNICAL BACKGROUND

An intraoral device is known from document EP 2143397 that comprises a pair of dental aligners intended to be disposed on the dental arches of the lower (mandible). Upper (maxilla) jaws of a subject, defining a median plane, comprising two lateral pivots on each aligner, and two substantially rigid connecting rods in a vestibular position respectively laterally connecting a pivot of one aligner to a pivot of the other aligner. The pivots are perpendicular to the median plane on each aligner and where each connecting rod is formed by a central part defining an axis and two end lugs each defining a plane. Both of the planes are defined by the end lugs being distinct and parallel to the aforementioned median plane. The axis of the central part intersects these two planes at a non-zero angle.

Such an intraoral device is particularly adapted for treating sleep apnea and snoring problems. By virtue of the two connecting rods connecting together the two, respectively maxilla and mandible, aligners, a mandibular driving force is allowed to be generated that is oriented in the direction of the mandibular propulsion, in order to maintain an offset of the mandible toward the front of the maxilla, while allowing lateral movements. This is then referred to as a mandibular advancement orthosis.

One problem that is generally raised is the adaptation of an aligner to the different shapes and dimensions of the arches and teeth of individuals, while allowing proper retention in the mouth to be obtained by gripping the aligner on the dental arch.

In order to overcome this problem, dental aligners are currently known that are produced from two materials with different properties. Thus, the two arch aligners are each produced in an outer shell made of substantially rigid material forming a continuous channel with a U-section. This outer shell is filled with an impression material made of relatively flexible thermoformable material. The thermoformable material forms an impression material filling. The outer shell is intended to conform to the teeth of the arch on which the aligner is pressed. This matching to the shape of the teeth allows the aligners to be retained on the dental arches, so that the device can remain in place throughout the entire duration during which it must be worn and thus provide the expected effectiveness. The impression material for the teeth also allows the retention forces to be distributed over the teeth and to thus prevent any dental pain for maximum comfort.

The outer shell, which is made of a relatively rigid plastic material, for its part allows the rigidity to be provided that is essential for the dimensional stability and for the overall lifetime of the device.

This rigidity is therefore essential, but it nevertheless involves having to define a single dental arch shape. However, a wide variety of shapes exists of more or less curved or wide dental arches. Furthermore, in order for the single shape of a rigid aligner to be able to be adapted to all the shapes of dental arches, a plurality of aligner models must be available with different shapes and dimensions that are precisely adapted to the teeth of the patient, or else an average single shape must be defined that is capable of being adapted to the majority. Also, an average curvature is conventionally defined for the aligners, and an aligner width (i.e. insertion width of the teeth) is provided that allows the dental arch to be broadly covered so that the dental arches that deviate from the average curvature imposed by the relatively rigid outer shell can be inserted therein, and thus so that a relatively universal device can be obtained.

However, the significant width of the insertion zone of the teeth that is required by this solution generates a significant volume in the mouth, making the device uncomfortable to wear.

SUMMARY OF THE INVENTION

Furthermore, an aim of the invention is to propose an intraoral device with a pair of dental aligners and associated connecting rods, for which the aligners allow a perfect match with the different shapes of dental arches of the patients, thus allowing it to be fitted on substantially all types of dental arches, while allowing the rigidity to be maintained that is necessary for the dimensional stability and the lifetime of the device.

The invention achieves this aim by virtue of an intraoral device with a pair of dental aligners. The aligners define a median sagittal plane. Each aligner comprises two, front or rear, transverse lateral fasteners intended to articulate the ends of two substantially rigid connecting rods intended to be disposed in a vestibular position and respectively laterally connecting a front fastener of one aligner to a rear fastener of the other aligner. Each aligner comprises an outer shell made of rigid plastic material having a U-shaped cross-section and a generally rounded V-shape, the branches of the V join at the front part of the outer shell, at the apex of the V. The outer shell is intended to be filled with a deformable impression material used for taking an impression of the teeth.

The front part of the outer shell of each aligner comprises a truncated part in the form of at least one elongate notch radially extending from the outward edge of the outer shell to an opposite inward edge, while leaving a part of the impression material between an end of the notch and the opposite edge. This creates a bending zone able to provide the outer shell with a degree of flexibility in a plane orthogonal to the median sagittal plane to permit bringing together or spacing apart the branches of the V of the outer shell.

The outer shell is provided with an oblong-shaped impression arranged in the front part on the outer face of the outer shell and extending on either side of the elongate notch, in order to cooperate with an attached wedge shaped and positioned to provide a mechanical abutment function designed to block further bending of the outer shell at a given curvature when the attached wedge is fixed in the impression.

Because of this arrangement in the front part of the rigid outer shell, the curvature of the aligner can be modified under the effect of a pressure manually applied at the free ends of the branches of the V (rear ends of the aligner), without resulting in breakage and the curvature can be modified in a repeated manner. Then the rigidity of the entire aligner can be re-established at a desired curvature by attaching the wedge that is fixed onto the corresponding impression of the outer shell. Thus, a user can try a plurality of aligner curvatures in order to determine the curvature that best corresponds to the shape of the user's dental arch.

Preferably, the attached wedge belongs to a set of attached wedges with different shapes, each intended to be adapted to a different curvatures of the outer shell.

Advantageously, the attached wedge can be formed by a one-piece part made of rigid plastic material.

Advantageously, the outward surface of the attached wedge is flush with the outer face of the outer shell when the wedge is fixed in the impression.

Preferably, the elongate notch is centered on the median sagittal plane.

Advantageously, the elongate notch extending radially across the outer shell extends from the outer (forward) edge to the inner edge of the outer shell.

Preferably, the attached wedge is fixed on the outer shell by clipping it onto the impression.

Advantageously, the device comprises a test aligner comprising means for fitting by detachably clipping the attached wedge onto the impression, in order to select the attached wedge from a set of attached wedges with different shapes during a phase of determining the curvature adapted to the user.

Advantageously, the device comprises means for fitting by permanently clipping the selected attached wedge onto the impression of the aligner intended for the end use.

Advantageously, each fastener and each connecting rod end comprises means for fitting, by pivoting on one another, the means for fitting two of the front or rear fasteners and the ends of associated connecting rods comprising a ball joint allowing lateral displacement of the connecting rod.

Further features and advantages of the invention will become clearly apparent from the following description of a particular embodiment of the invention, which is provided by way of a non-limiting example, with reference to the accompanying drawings, in which:

DESCRIPTION OF EMBODIMENTS

Figure 1:
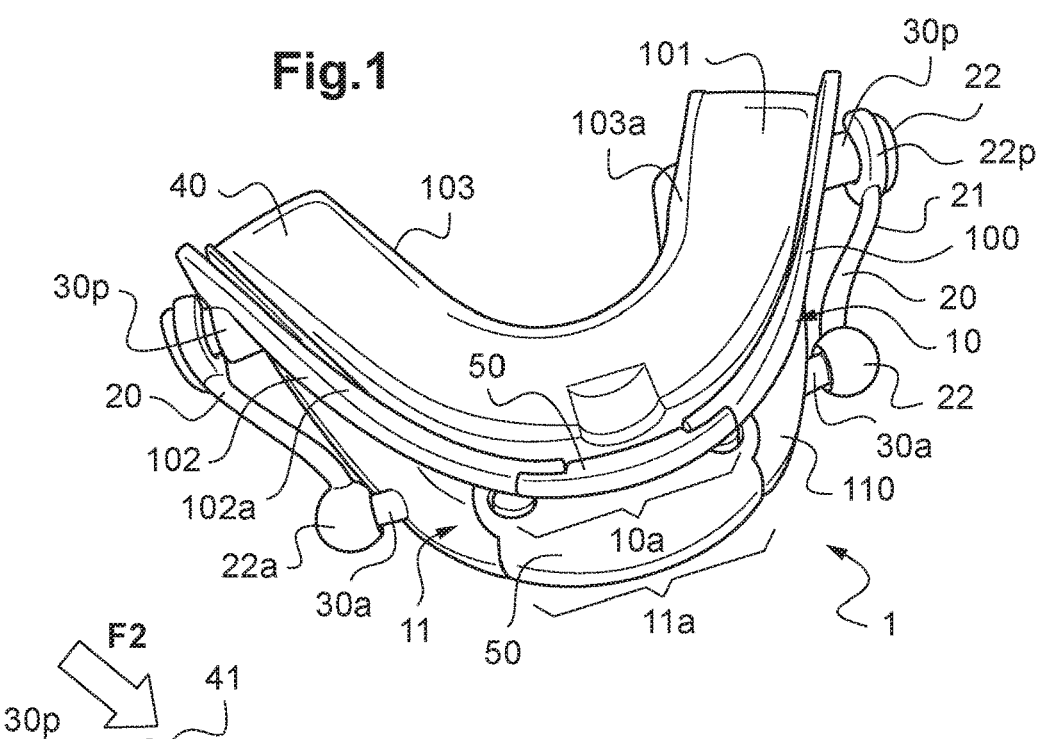
FIG. 1 is a schematic perspective view of a device according to the invention.

The device 1 comprises two aligners 10, 11, respectively one aligner 10 for the dental arch of the upper jaw (or maxilla) and one aligner 11 for the dental arch of the lower jaw (or mandible). The two aligners 10, 11 are symmetrical relative to the median sagittal plane P of the aligners and are formed by an outer shell 100, 110 made of rigid plastic material, each shell substantially having a hollow U-section shaped channel. The plane of extension and of contact of the aligners, which is defined between the upper 10 and lower 11 aligners, is defined as a transverse plane orthogonal to the plane P. The two aligners are intended to receive, in the channel thereof, a flexible material 40 made of thermoformable material intended to take the impression of the teeth, for example, made of EVA (ethylene vinyl acetate).

The outer shell 100, 110 forming each aligner 10, 11 is substantially in the general shape of a V, the lower angle of which is rounded and the branches of which join forming the front part 10a, 11a of the aligner. As can be seen in FIG. 1, the outer shell 100 of the upper aligner 10 has a substantially flat internal base 101, which is surrounded by external 102 and internal 103 walls that are substantially disposed vertically, extending facing one another from the internal base 101 and respectively defined by an outer edge 102a and an inner edge 103a. More specifically, each outer 102 and inner 103 wall has a curved section, substantially extending in the front part 10a of the aligner, surrounded by two symmetrical lateral extensions that are substantially straight or have a very high curvature radius. The outer 102 and inner 103 walls of the outer shell 100 together provide an aligner width ranging from a minimum value in the front part 10a of the aligner to a maximum value at the rear ends. The outer shell 110 of the lower aligner 11 has a configuration similar to that of the outer shell of the upper aligner that has just been described.

Figure 2:
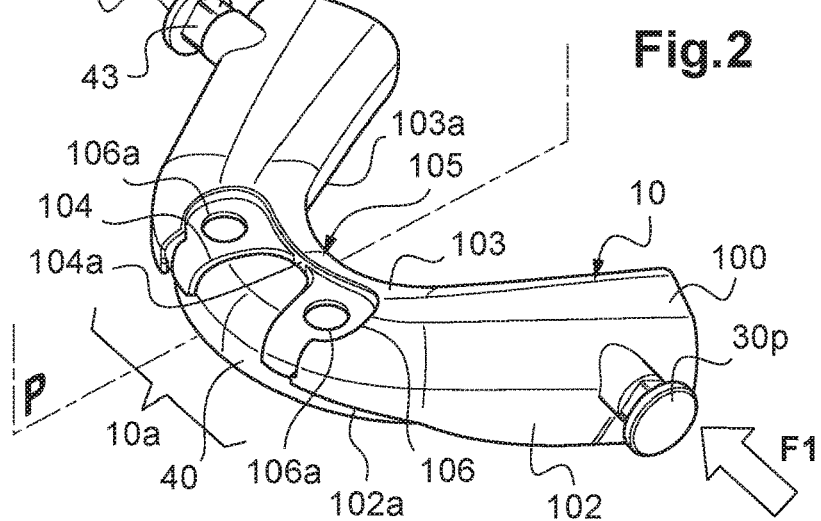
FIG. 2 is a bottom perspective view of the upper aligner (maxilla) of FIG. 1, without the attached wedge.

Given the relatively rigid nature of the material forming the outer shell of the aligners, if this shell was continuous, then due to its geometry, it would be substantially non-deformable. By contrast, and as is more clearly shown in FIG. 2 showing the upper aligner 10 of FIG. 1 on its own as a bottom view, the rigid outer shell 100 of the upper aligner 10 comprises a truncated part in its front part 10a, and only in its front part 10a, with this truncated part being in the form of an elongate notch 104, which radially extends from the outer edge 102a of the outer shell 100 toward the opposite edge, or toward the inner edge 103a of the outer shell 100, while leaving a part of the material in a zone 105 extending between an end 104a of the notch 104 and the inner edge 103a. In other words, the notch 104 extends, in the width of the aligner in the front part 10a thereof, preferably from the outer wall 102a toward the inner wall 102b. The recess that is thus created by the elongate notch 104 in the outer shell preferably extends over at least 70% and even more preferably over at least 90% of the width of the aligner. Also, the part of the material remaining in the zone 105 defined by the end of the notch 104 and the inner edge 102b is basically formed by the portion of the inner wall 102 extending in this zone facing the elongate notch 104 and optionally by a small part of the base of the outer shell. The elongate notch 104 is also centered on the median sagittal plane P and extends on either side of the median sagittal plane.

This truncated part arranged in the front part 10a of the outer shell 100, by virtue of the notch 104 extending over the width of the aligner, thus allows a bending zone to be created that allows the outer shell 100 to be provided with a certain degree of flexibility in the plane orthogonal to the median sagittal plane P, by bringing together or spacing apart the branches of the V of the outer shell 100. Indeed, the dimension of the part of the material remaining in the zone 105 is such that it allows the curvature of the outer shell 100 to be modified under the effect of pressure applied on the rear ends of the outer shell, as shown by the arrows F1 and F2 in FIG. 2, and does so without resulting in a breakage. Furthermore, outside the front part 10a, the outer shell 100 is continuous over the whole of the aligner, so as to provide the required rigidity.

Figure 3A:
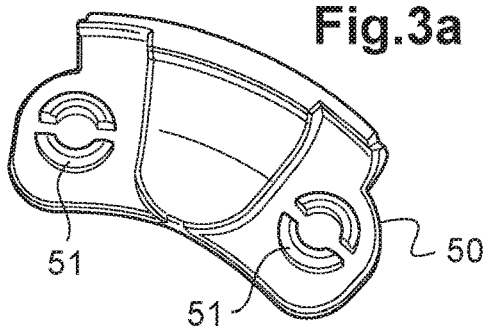
FIGS. 3a and 3b are detailed perspective views showing examples of attached wedges with different shapes.

Furthermore, as shown in FIG. 2, the outer shell 100 comprises, on its outer face in the front part, an oblong-shaped impression 106, formed in the thickness of the outer face of the outer shell 100, so as to extend on either side of the elongate notch 104. In other words, the impression 106 overlaps the elongate notch 104, preferably over its entire breadth. The impression 106 is intended to receive an attached wedge 50. The shape of the wedge matches that of the impression 106. When it is housed in the impression, this wedge will provide a mechanical abutment function designed to block the bending of the outer shell 100 at a given curvature. The curvature of the aligner is modified, in particular reduced, due to the pressure exerted at the rear ends of the branches of the aligner. Then the selected curvature is set using the attached wedge 50 that fixes itself in the impression 106, so as to re-establish the rigidity of the whole of the aligner, with the outer shell also being continuous over the whole of the rest of the aligner. As shown in FIG. 3a, the attached wedge 50 is formed by a one-piece part, of generally oblong shape, made of rigid plastic material, for example, made from the same material as that used to produce the outer shell of the aligners.

The attached wedge 50 is preferably fixed by clipping the wedge onto the impression 106. For example, as shown in FIG. 3a, the attached wedge 50 can be fitted on the impression 106 by clipping matching-shaped parts 51, 106a respectively arranged on surfaces of the attached wedge 50 and of the impression 106 intended to be brought opposite each other when the attached wedge is fitted on the impression 106.

Advantageously, to avoid affecting the comfort in the mouth of the user, the attached wedge 50 is shaped so as to be flush with the outer face of the outer shell 100 when the wedge is fixed in the impression 106, so that once the wedge is in place, it perfectly matches and is flush with the outer face of the outer shell, making its presence unnoticeable to the user.

Figure 3B:
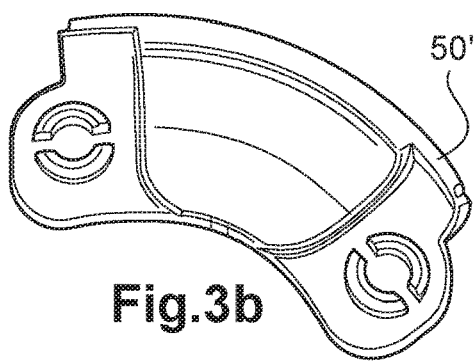

An aim that is sought to allow the user to test a plurality of curvatures of the aligner in order to determine the curvature that is best adapted to the shape of the user's dental arch. Furthermore, the attached wedge belongs to a set of attached wedges with different shapes, as shown by the examples of attached wedges 50, 50' shown in FIGS. 3a and 3b, which are intended to be adapted to different curvatures of the outer shell. Indeed, when modifying the curvature of the outer shell, that shell experiences a deformation, particularly in its front part, and as a result, the impression 106 will assume different shapes, under the effect of the applied curvature. Moreover, the set of attached wedges is intended to provide attached wedges with different shapes that are able to correspond to the shape assumed by the impression 106 under the effect of the curvature.

In a first instance, which corresponds to a phase of determining the curvature that is best adapted to the user, provision is made to use a test aligner, having an outer shell comprising exactly the same features as those that have just been described. Provision is simply made for the means for fitting by clipping the attached wedge onto the outer shell to be detachable, so that the different tested wedges can be easily clipped on and clipped off, in order to select the suitable attached wedge from the set of attached wedges with different shapes. It is thus possible to test a plurality of curvatures using the set of attached wedges with different shapes, by positioning the test aligner on the dental arch of the user for each tested attached wedge.

When it is found that the obtained curvature is adapted to the user, the corresponding attached wedge is identified from the set of attached wedges and it is fixed on the aligner intended for the end use. Advantageously, provision is made for the means for clip-fitting the selected attached wedge onto the outer shell to be permanent, so that the attached wedge cannot be detached during use and to thus avoid any risk of ingestion or choking by the user.

When the curvature for the aligner intended for the end use has been determined, the outer shell can be filled with the impression material in order to adapt this material for filling the aligner to the shape of the teeth.

As shown in FIG. 1, the aligner 11 of the lower arch is shown in advance of the aligner 10 of the lower arch.

The two aligners 10 and 11 are connected by two connecting rods 20 each articulated at the two ends thereof on front 30a and rear 30p transverse lateral fasteners. Each fastener is respectively connected to an arch aligner 10 or 11, and is molded with the outer shells of the aligners, allowing the ends of the connecting rods to be fastened thereto in an articulated, simple and detachable manner. The example of FIG. 1 relates to a system for advancing the lower jaw by propulsion, in which the front fasteners 30a are positioned on the lower aligner 11 and the rear fasteners 30p are positioned on the upper aligner 10 (as opposed to a traction system, where the front fasteners are located on the upper aligner and the rear fasteners are located on the lower aligner). The term transverse lateral fastener is understood to mean that the axis of articulation that it defines in cooperation with the end of the associated connecting rod is transverse to the median sagittal plane, and preferably orthogonal thereto (i.e. so as to form a pivot axis for the connecting rod that is orthogonal to the sagittal plane) when the aligners exhibit their nominal curvature, i.e. which has not been modified as previously explained. The connecting rods 20 are in a vestibular position, lateral to the jaws. Each connecting rod, which is made of molded rigid plastic material, is formed by a central part 21 defining an axis and by two end lugs 22 each defining a plane, the two planes defined by the end lugs being distinct and parallel and the axis of the central part intersecting these two planes at a non-zero angle. As described in document EP 2143397 cited in the preamble, such a connecting rod configuration allows a better thrust to be exerted from one jaw to the other. Furthermore, as in the invention of document EP 2143397, the two connecting rods 20 belong to a set of a plurality of connecting rods with different lengths, intended to be adapted to different forward movements of one jaw relative to the other.

As will be explained, two different means are provided for the articulated fitting of the connecting rods 20 on the front and rear fasteners, so as to allow optimal retention of the connecting rods, including in situations where the differences in curvature between the two aligners is significant, in particular when the curvature radius of the lower aligner is very low relative to the curvature radius of the upper aligner, in which case the fastening planes of the respective ends of the connecting rod are offset.

To this end, in the example of FIG. 1 showing the two aligners with the transverse lateral fasteners articulating the two connecting rods by propulsion, the means for fitting the front fasteners 30a and the ends of associated connecting rods are transverse resilient interlocking means and advantageously implement a ball joint, so as to allow a lateral displacement of the connecting rod relative to the aligner, and resulting in an adaptation to the differences in curvature. Furthermore, the ball joint that is implemented between the front fasteners of the lower aligner and the ends of associated connecting rods in the mandibular propulsion advancement system of FIG. 1 allows effective fixing of the connecting rods, irrespective of the differences in curvature between the lower and upper aligners. The ball joint of the means for fitting between the front fasteners and the ends of associated connecting rods is, for example, produced by nesting a spherical end (not shown) of the fastener 30*a* in a cavity 22*a* in the end of the connecting rod. These means for fitting forming a ball joint are advantageously of the transverse interlocking type, i.e. in the transverse axis of the fasteners.

The means for fitting the front fasteners 30*p* and the ends of associated connecting rods are, for their part, of the open ring radial locking type, as disclosed in patent document FR 2993769 by the same applicant. Thus, the connecting rod 20 has an end 22*p* with an open circular profile on a sufficient section, so as to be able to be engaged in a groove 41, provided with opposite parallel flats 43, of a pivot formed on the rear fastener 30*p* (FIG. 2). Therefore, open ring radial locking herein refers to the type of pivoting fitting obtained by engaging a rear fastener thus configured and an open ring end of a connecting rod, the rear fastener exhibiting, in a certain orientation, a transverse dimension that is smaller than the opening of the ring, and, in the other orientations, a transverse dimension that is larger than the opening of the ring, so that the open ring can be introduced into a precise radial orientation relative to the rear fastener, and, once it has been introduced therein, it can turn therein but is transversely blocked as long as it does not return to its introduction orientation. The radial introduction orientation (relative to the axis of articulation) is selected to correspond to a radial position of the connecting rod relative to the aligner that is significantly different from the work position of the connecting rod once fitted (i.e. fixed onto its two front and rear fasteners). In the connection rod fitted position, the open ring locking securely locks the connecting rod on the fastener.

The invention claimed is:

1. An intraoral device comprising:
    a pair of dental aligners, the aligners defining a median sagittal plane;
    each aligner comprising one set of two front transverse lateral fasteners and one set of two rear transverse lateral fasteners;
    two substantially rigid connecting rods disposed in a vestibular position, each rigid connecting rod laterally connecting a respective front transverse lateral fastener of one of the pair of dental aligners to a respective rear transverse lateral fastener of the other of the pair of dental aligners, each of the two transverse lateral fasteners being configured to articulate a respective end of the connected connecting rod;
    each aligner comprising a V-shaped outer shell having a U-shaped cross section, the V-shaped outer shell having branches which join at a front part of the V-shaped outer shell;
    the front part of the V-shaped outer shell of each aligner comprises a truncated part, the truncated part being an elongate notch radially extending from an edge of the V-shaped outer shell to an opposite edge of the V-shaped outer shell, while leaving a part of the V-shaped outer shell between an end of the notch and an opposite edge, creating a bending zone configured to provide the V-shaped outer shell with a degree of flexibility in a plane orthogonal to the median sagittal plane for enabling bringing together or spacing apart the branches of the V-shaped outer shell;
    the notch in the V-shaped outer shell being configured to be filled with a deformable impression retaining material;
    the V-shaped outer shell also having an oblong-shaped impression in the front part on an outer face of the V-shaped outer shell and extending on either side of the elongate notch, the oblong-shaped impression cooperating with a wedge, the wedge being configured to provide a mechanical abutment function designed to block bending of the V-shaped outer shell at a given curvature when the wedge is fixed in the impression.

2. The device as claimed in claim 1, wherein the wedge is from a plurality of wedges having different shapes, each shape being adapted to a different curvature of the V-shaped outer shell and adapted to being placed in the notch to serve as the abutment.

3. The device as claimed in claim 1, wherein the wedge is a one-piece part.

4. The device as claimed in claim 1, wherein the wedge and the notch are so shaped that the wedge in the notch is flush with an outer face of the outer shell when the wedge is fixed in the impression.

5. The device as claimed in claim 1, wherein the elongate notch is centered on the median sagittal plane.

6. The device as claimed in claim 5, wherein the elongate notch radially extends from an outer edge to an inner edge of the V-shaped outer shell.

7. The device as claimed in claim 1, wherein the wedge is configured to be fixed by clipping onto the impression.

8. The device as claimed in claim 2, further comprising a test aligner comprising means for fitting by detachably clipping the wedge onto the impression, in order to select the wedge from the set of wedges with different shapes during a phase of determining the curvature.

9. The device as claimed in claim 7, further comprising means for fitting by permanently clipping the selected wedge onto the impression of the aligner configured for an end use.

10. The device as claimed in claim 1, wherein each rigid connecting rod is connected with a ball joint allowing lateral displacement of the connecting rod.

11. An intraoral device, comprising:
    a pair of dental aligners, the aligners defining a median sagittal plane;
    connecting devices between the aligners configured to enable relative movement of the aligners;
    each aligner comprising a V-shaped outer shell comprising branches which join at a front part of the V-shaped outer shell;
    the front part of at least one of the outer shells comprises at least one notch extending along the front part and creating a bending zone configured to provide the V-shaped outer shell with a degree of flexibility in a plane orthogonal to the median sagittal plane for enabling bringing together or spacing apart the branches of V shaped outer shell;
    the notch in the V-shaped outer shell being configured to be filled with a deformable material; and
    the V-shaped outer shell also having an impression in the front part on an outer face of the notch for cooperating with a wedge configured to provide a mechanical abutment function designed to block bending of the V-shaped outer shell at a selected curvature.

12. In combination, the intraoral device of claim 11 and a wedge shaped to fit into the notch and to block movement of the branches of the aligner for a selected angle between the branches.

13. The device as claimed in claim 1, wherein the V-shaped outer shell has a generally rounded V shape.

14. The device as claimed in claim 11, wherein the V-shaped outer shell has a generally rounded V shape.

* * * * *